(12) United States Patent  (10) Patent No.: US 7,641,013 B2
Kim et al.  (45) Date of Patent: Jan. 5, 2010

(54) BATTERY MOUNTING STRUCTURE FOR HYBRID VEHICLES

(75) Inventors: Won-Sup Kim, Gyeonggi-do (KR); Yu-Seorg Jeong, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 436 days.

(21) Appl. No.: 11/607,330

(22) Filed: Nov. 30, 2006

(65) Prior Publication Data

US 2008/0078596 A1  Apr. 3, 2008

(30) Foreign Application Priority Data

Sep. 28, 2006  (KR) .................. 10-2006-0094671

(51) Int. Cl.
*B60R 16/04* (2006.01)
(52) U.S. Cl. .................. 180/68.5; 903/951; 903/952
(58) Field of Classification Search .............. 180/65.1, 180/68.5; 429/159; 903/907, 908, 951, 952
See application file for complete search history.

(56) References Cited

U.S. PATENT DOCUMENTS

| 4,311,205 | A | * | 1/1982 | Goodacre et al. | 180/68.5 |
| 4,438,589 | A | * | 3/1984 | Matsushiro | 446/462 |
| 5,197,559 | A | * | 3/1993 | Garin et al. | 180/65.1 |
| 6,158,538 | A | * | 12/2000 | Botzelmann et al. | 180/68.5 |
| 6,410,185 | B1 | * | 6/2002 | Takahashi et al. | 429/163 |
| 7,066,515 | B2 | * | 6/2006 | Pierce et al. | 296/21 |
| 2004/0144580 | A1 | * | 7/2004 | Wu | 180/68.5 |
| 2004/0226765 | A1 | * | 11/2004 | Mathews et al. | 180/68.5 |
| 2008/0268330 | A1 | * | 10/2008 | Hansen et al. | 429/97 |

FOREIGN PATENT DOCUMENTS

| JP | 6048185 | 2/1994 |
| JP | 7192774 | 7/1995 |
| JP | 11208287 | 8/1999 |
| JP | 2003079003 | 3/2003 |

* cited by examiner

*Primary Examiner*—Frank B Vanaman
(74) *Attorney, Agent, or Firm*—Edwards Angell Palmer & Dodge LLP; Peter F. Corless

(57) ABSTRACT

A battery mounting structure for hybrid vehicles is provided, which can easily mount a battery structure in a vehicle and easily change the position of the battery package between a vertical position and a horizontal position.

12 Claims, 8 Drawing Sheets

BATTERY MOUNTING STRUCTURE FOR HYBRID VEHICLES

CROSS-REFERENCE TO RELATED APPLICATIONS

The present application is based on, and claims priority from, Korean Patent Application Serial Number 10-2006-0094671 filed with the Korean Intellectual Property Office on Sep. 28, 2006, the disclosure of which is hereby incorporated by reference herein in its entirety.

FIELD OF THE INVENTION

The present invention relates to a battery mounting structure for a hybrid vehicle, and more particularly, to a battery mounting structure that can easily mount a battery package in a vehicle and easily change the position of the battery package between a vertical position and a horizontal position.

BACKGROUND OF THE INVENTION

Vehicles, including hybrid vehicles, are provided with batteries to supply electricity to motors for operating the vehicles. Generally, batteries are relatively large and heavy. Depending on the structure for mounting a battery in a vehicle, space utilization of vehicles, and convenience and safety of vehicle users, and so on can vary.

To date, two types of battery mounting structures have been developed: vertical type and horizontal type. In a vertical type battery mounting structure, a battery and an inverter are manufactured as an integrated package and the package is mounted to the rear surface of a rear seat of a vehicle in the direction parallel with the rear seat.

In the vertical structure, a relatively large space is obtained behind the rear seat, and the space can be used as a trunk space, thereby facilitating the process of placing or removing a spare tire into or from the trunk. Furthermore, the amount of space required to absorb impact caused in the event of a rear-end collision is increased, which enhances the safety of vehicle users.

On the other hand, in a horizontal type batter mounting structure, an integrated package comprising a battery and an inverter is horizontally oriented on the floor in the rear of a vehicle. Compared with the vertical structure, this horizontal structure is relatively easy to mount the integrated package in the vehicle. Additional advantage of this structure is that relatively long articles such as skis can be easily loaded into the vehicle after the rear seat has been folded down. However, due to the horizontal orientation of the battery mounting structure, the trunk space becomes smaller and the amount of space that can be deformed to absorb impact in the event of a rear-end collision may be insufficient. Also, it is inconvenient to place or remove a spare tire into or from the trunk.

There is thus a need for an improved battery mounting structure that can easily mount a battery package in the vehicle, ensure sufficient trunk space to absorb impact in the event of a rear-end collision and to store a spare tire, and can load relatively long articles, such as skis, into the vehicle after a rear seat is folded down.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

In one aspect, the present invention provides a batter mounting structure that can easily mount a battery structure in a vehicle and easily change the position of the battery package between a vertical position and a horizontal position.

A battery mounting structure according to an embodiment of the present invention comprises a cylindrical shaft member, vertical position maintaining means, and horizontal position maintaining means. The cylindrical shaft member is provided in a rear edge of a lower end of a battery package which is adjacent to a rear end of the vehicle. The cylindrical shaft member serves as a rotating shaft for the battery package so that the battery package is rotatable around the cylindrical shaft member with respect to the vehicle body. Preferably, an electric wire of the battery package extends through the cylindrical shaft member outside the battery package. The vertical position maintaining means maintains the battery package in a vertically oriented state behind a rear seat of the vehicle. The horizontal position maintaining means maintains the battery package in a horizontally oriented state on an upper surface of a rear floor of the vehicle.

In another aspect, motor vehicles are provided that comprise a described battery mounting structure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like. The present battery mounting systems will be particularly useful with a wide variety of motor vehicles.

Other aspects of the invention are discussed infra.

BRIEF DESCRIPTION OF THE DRAWINGS

For a better understanding of the nature and objects of the present invention, reference should be made to the following detailed description with the accompanying drawings, in which.

DETAILED DESCRIPTION

Figure 1:
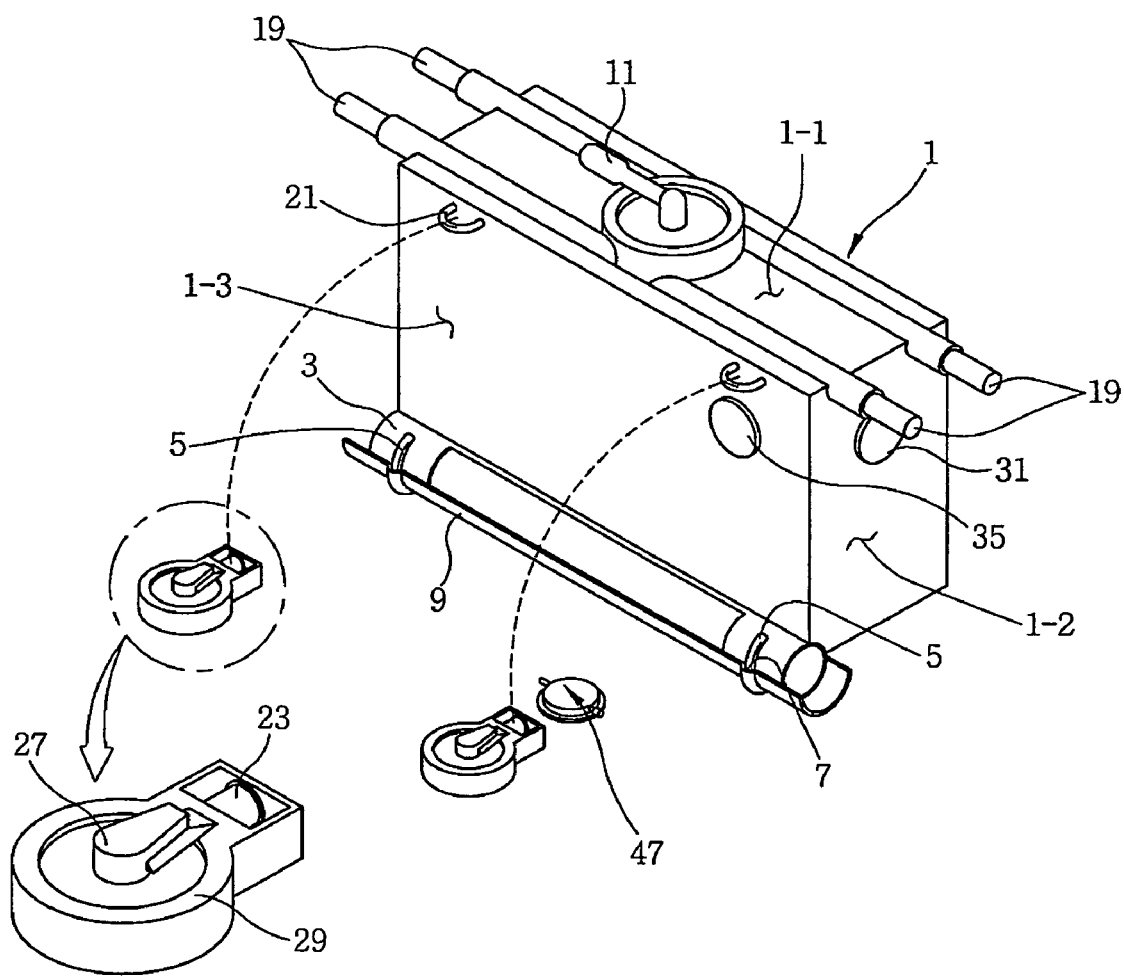
FIG. 1 is a view showing a battery mounting structure for hybrid vehicles, according to an embodiment of the present invention.

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

Figure 2:
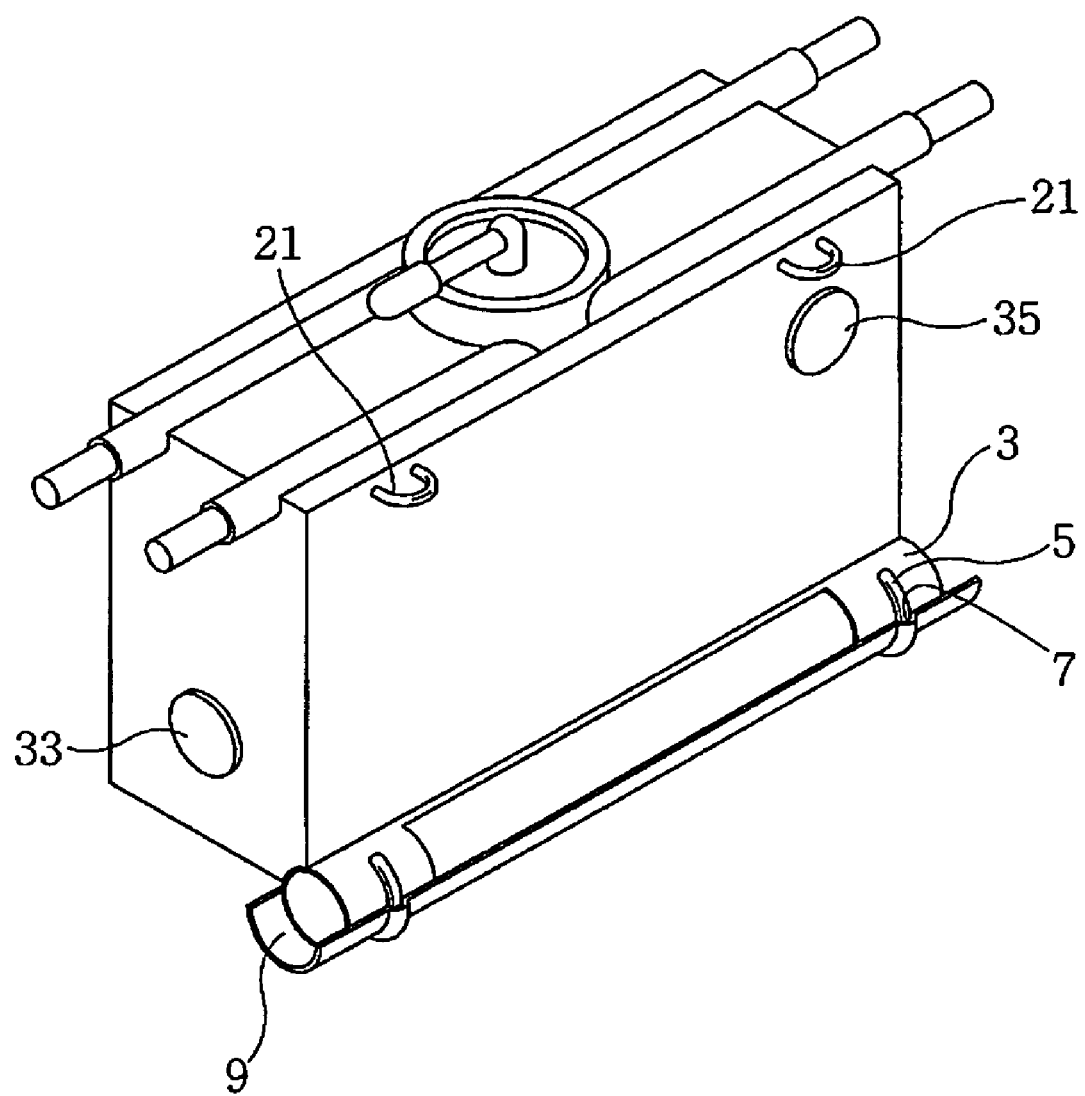
FIG. 2 is a view showing the other side of a battery package of FIG. 1.

Referring to FIGS. 1 and 2, a preferred embodiment of the present invention comprises a cylindrical shaft member 3. The cylindrical shaft member is integrally provided in a rear edge of a lower end of a battery package 1 which is adjacent to a rear end of a vehicle. It serves as a rotating shaft for the battery package 1 such that the battery package 1 is rotatable around the cylindrical shaft member 3 with respect to the vehicle body. An electric wire for the battery package 1 extends outside through the cylindrical shaft member 3.

Such preferred embodiment of the present invention further comprises a vertical position maintaining means to maintain the battery package 1 in a vertically oriented state behind a rear seat of the vehicle, and a horizontal position maintaining means to maintain the battery package 1 in a horizontally oriented state on the upper surface of the rear portion of the floor.

Here, the term "battery package" is recited herein to refer to not only a battery for operating a motor of a hybrid vehicle but also a battery package in which the battery is combined with an inverter.

In other words, the battery can be simply packaged alone or the battery and the inverter can be packaged together.

For reference, as shown in the drawings, the battery package 1 extends a predetermined length in a transverse direction of the vehicle body and is provided in a space defined between the rear seat and the trunk of the vehicle such that it is rotatable around the cylindrical shaft member 3, which is oriented in a transverse direction of the vehicle body.

On the basis of the vertically oriented state of the battery package 1, as shown in FIG. 1, a surface 1-1 will be called an upper surface of the battery package 1, surfaces 1-2 will be called opposite end surfaces of the battery package 1, and a surface 1-3 will be called a rear surface of the battery package 1 which face the rear end of the vehicle body.

Stop beads 5, each of which has a predetermined cross-section and a predetermined length, are provided on a circumferential surface of the cylindrical shaft member 3. A support member 9, which has stop grooves 7 that receive the respective stop beads 5 therein, is provided in the vehicle body, so that the cylindrical shaft member 3 is prevented from being undesirably moved in a longitudinal direction thereof.

Furthermore, a separate bracket, which surrounds the cylindrical shaft member 3, is mounted to the vehicle body, so that the battery package 1 can stably and smoothly rotate around the cylindrical shaft member 3 between the vertical position and the horizontal position thereof.

When the battery package 1 is rotated between the vertical position and the horizontal position, the electric wire, which is connected to the battery package 1 through the cylindrical shaft member 3, is not deformed, thus maintaining a stable electric connection.

Figure 3:
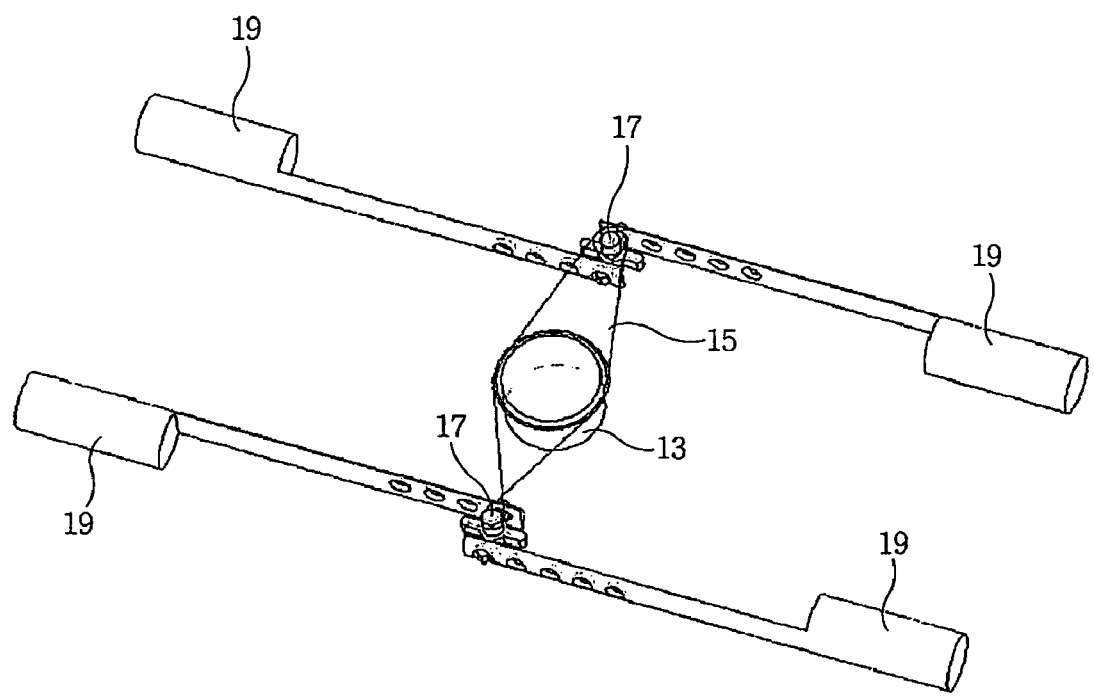
FIG. 3 is a view illustrating the structure and operation principle of a vertical position maintaining means according to the present invention.
Figure 4:
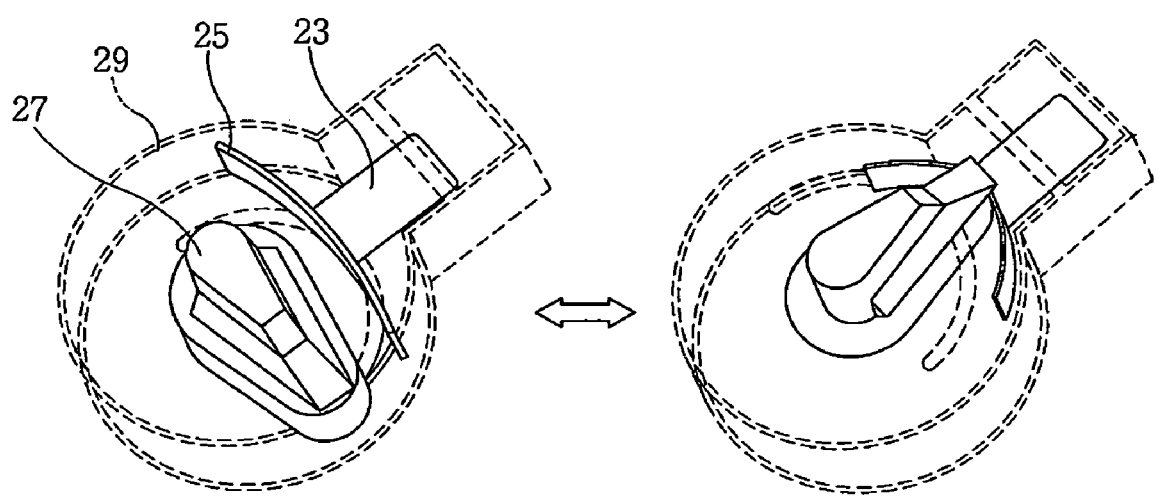
FIG. 4 is views illustrating the structure and operation principle of a horizontal position maintaining means according to the present invention.
Figure 5:
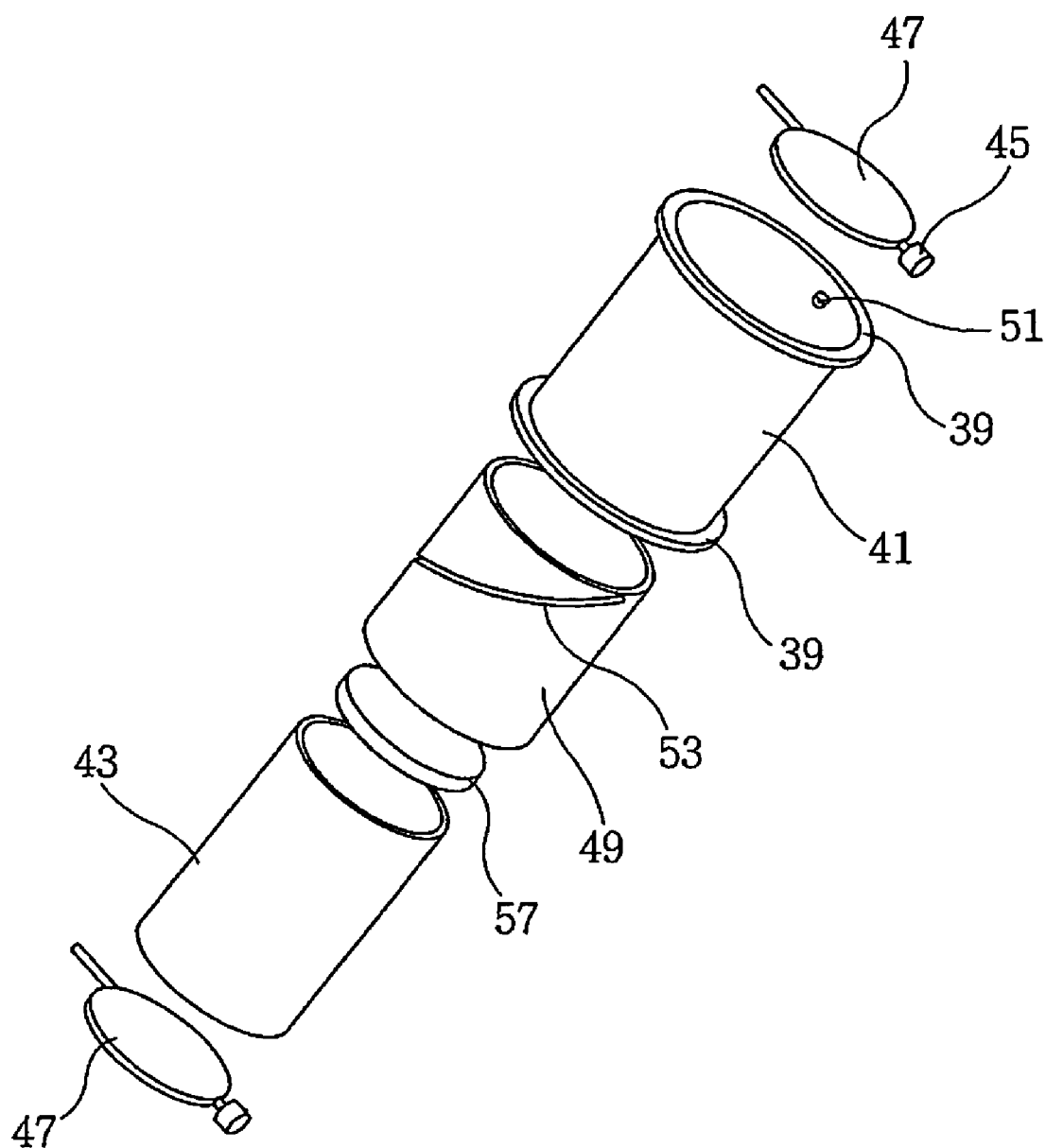
FIG. 5 is an exploded perspective view of a horizontal position air supply means according to the present invention.
Figure 6:
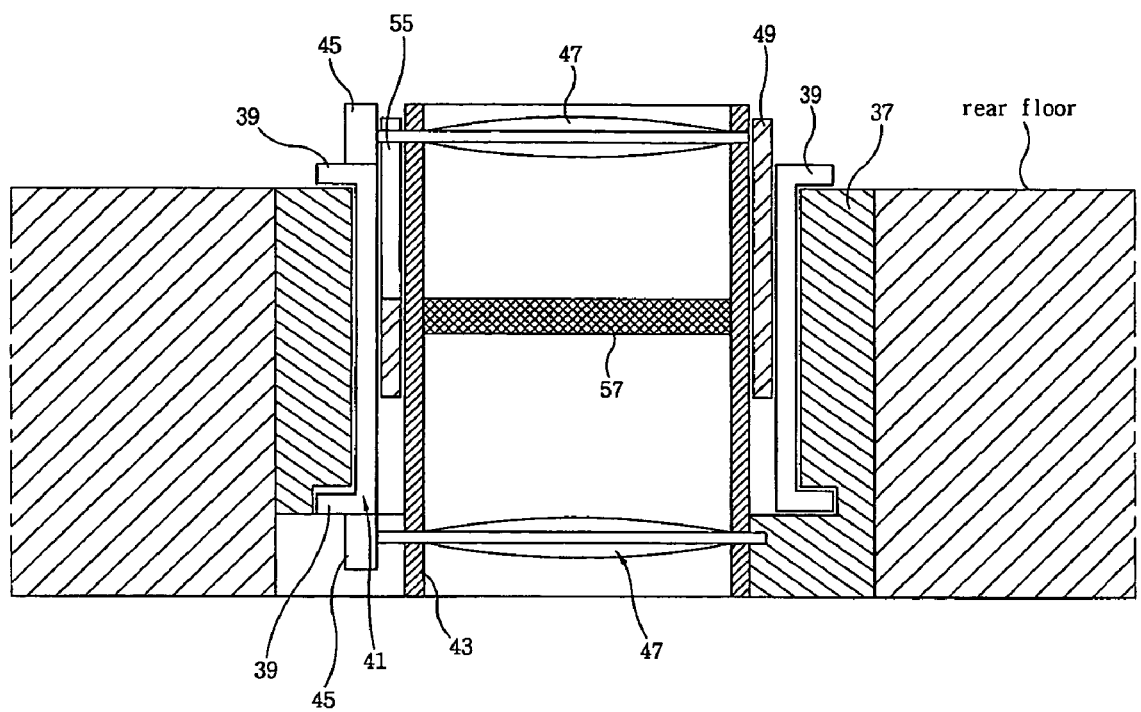
FIG. 6 is a sectional view showing the horizontal position air supply means of FIG. 5 mounted to a floor panel.
Figure 7:
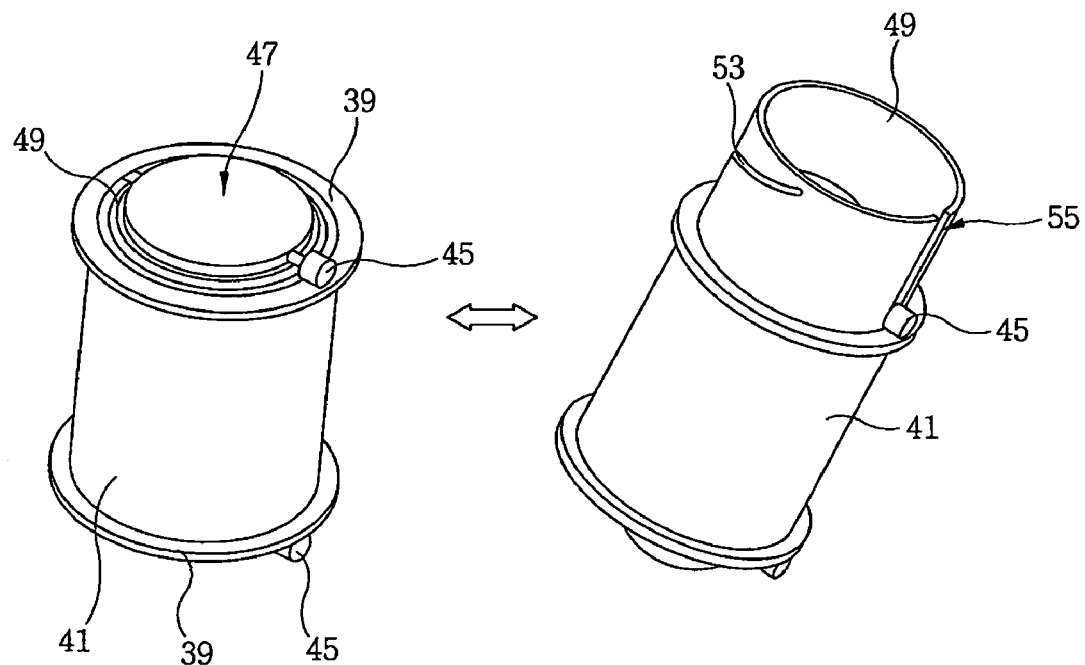
FIG. 7 is views showing operation of a connection cylinder and flap valves when a drive cylinder of the horizontal position air supply means of FIG. 5 is rotated.

Referring to FIGS. 1 through 3, the vertical position maintaining means comprises a handle 11, which is rotatably provided on the upper surface of the battery package 1, a drive drum 13, which is rotated by rotation of the handle 11, and saw-toothed rotators 17, which are coupled to the drive drum 13 through belts 15. The vertical position maintaining means further comprises vertical position locking bars 19, each of which has a plurality of insert holes, which engage with the saw-toothed rotator 17, at positions spaced apart from each other at regular intervals, and which are placed at opposite sides of each saw-toothed rotator 17 such that they face each other, so that the vertical position locking bars 19 can be advanced from or retracted into the opposite end surfaces of the battery package 1 by rotation of the saw-toothed rotors 17.

In other words, when the handle 11 is rotated, the rotating force is transmitted to the saw-toothed rotators 17 through the drive drum 13 and the belts 15. When the saw-toothed rotators 17 are rotated, the vertical position locking bars 19 are advanced from or retracted into the opposite end surfaces of the battery package 1 together.

While the battery package 1 is vertically oriented, if the vertical position locking bars 19 are advanced from the opposite end surfaces of the battery package 1 and inserted into respective holes, which are formed in the vehicle body at corresponding positions, the battery package 1 is securely fastened to the vehicle body by the vertical position locking bars 19 and the cylindrical shaft member 3.

Referring to FIGS. 1 through 4, the horizontal position maintaining means comprises a catch 21, which is provided on the rear surface of the battery package 1, and a horizontal position locking bar 23, which is designed to be linearly moved in a direction parallel to the rear floor so that the horizontal position locking bar 23 can be removably locked to the catch 21 while the battery package 1 is horizontally oriented on the upper surface of the rear floor. The horizontal position maintaining means further comprises a plate spring 25, which is integrally coupled to the horizontal position locking bar 23 such that the locking bar 23 is biased in the direction in which the locking bar 23 is removed from the associated catch 21, and a cam knob 27, which has a vertical rotating shaft and is provided on the rear floor so as to be rotatable around the vertical rotating shaft, so that when the cam knob 27 is rotated in one direction, the locking bar 23 is moved in a direction in which the locking bar 23 is locked to the catch 21 while overcoming the elasticity of the plate spring 25, thereby maintaining the battery package 1 in the horizontally oriented state. The horizontal position maintaining means further comprises a support body 29, which is mounted to the rear floor to cover the locking bar 23, the plate spring 25 and the cam knob 27 in a single body.

That is, when a user rotates the cam knob 27 in one direction, the locking bar 23 is locked to or unlocked from the catch 21.

When the user manipulates the handle 11 such that the vertical position locking bars 19 are retracted into the battery package 1 which has been oriented vertically, and rotates the battery package 1 around the cylindrical shaft member 3 onto the upper surface of the rear floor, the catch 21 is inserted into the support body 29. In this state, the user rotates the cam knob 27. Thereby, the horizontal position locking bar 23 overcomes the elasticity of the plate spring 25 and can be advanced towards and locked to the catch 21. Then, the battery package 1 is stably fastened to the vehicle body in a horizontally oriented state by the cylindrical shaft member 3, the catch 21 and the horizontal position locking bar 23.

Meanwhile, referring to FIGS. 1, 2, 5 through 7, the embodiment of the present invention may further comprise a horizontal position air supply means, which supplies air from a rear floor side into the battery package 1 through the rear surface of the battery package 1 while the battery package 1 is in a horizontally oriented state on the upper surface of the rear floor, a vertical position air inlet 31, which is formed at an upper position in one end surface of the battery package 1 for the supply of air into the battery package 1 through one selected from the horizontal position air supply means and the vertical position air inlet 31, and an air outlet 33, which is formed at a lower position in the other end surface of the battery package 1 to discharge air, which is drawn into the battery package 1 through the horizontal position air supply means or the vertical position air inlet 31.

That is, air is supplied into the battery package 1 through the horizontal position air supply means or the vertical position air inlet 31, and the supplied air is discharged outside through the air outlet 33.

The horizontal position air supply means comprises a horizontal position air inlet 35, which is formed in the rear surface of the battery package 1. Furthermore, the horizontal position air supply means further comprises an outer barrel 37, which is provided through the rear floor at a position corresponding to the horizontal position air inlet 35 when the battery package 1 is horizontally oriented on the upper surface of the rear floor, a drive cylinder 41, which is rotatably placed in the outer barrel 37 and has drive flanges 39 on the upper and lower ends thereof, and an inner barrel 43, which is placed in the drive cylinder 41 and is coupled at a position thereof to the outer barrel 37. The horizontal position air supply means further comprises a flap valve 47, a rotating shaft of which is supported by the inner barrel 43 and which has an integral roller 45 that is in rolling contact with one drive flange 39 of the drive cylinder 41, so that when the drive flange 39 is rotated, the flap valve 47 is rotated around the rotating shaft perpendicular to the rotating axis of the drive flange 39 to open or close the inner barrel 43.

Furthermore, a connection cylinder 49, which is designed to be linearly moved in a direction perpendicular to the rear floor, may be provided between the drive cylinder 41 and the inner barrel 43. A guide protrusion 51 may suitably be provided on the circumferential inner surface of the drive cylinder 41. A spiral guide slot 53 may preferably formed in the circumferential outer surface of the connection cylinder 49. A linear guide slot 55 may also suitably be longitudinally formed in the connection cylinder 49 for placement of the rotating shaft of the flap valve 47 in the linear guide slot 55 of the connection cylinder 49. Thus, when the drive cylinder 41 is rotated, the connection cylinder 49 is moved in a vertical direction by rotation of the guide protrusion 51 of the drive cylinder 41, which engages with the spiral guide slot 53 of the connection cylinder 49.

A filter 57 for filtering air passing through the inner barrel 43 may further be provided in the inner barrel 43. In the embodiment of the present invention, two flap valves 47 are respectively provided above and below the filter 57 and are rotated by rotation of the drive cylinder 41.

The vertical position air inlet 31 is used to supply air into the battery package 1, which is in a vertically oriented state. At this time, the horizontal position air inlet 35 is closed with a cap, as shown in the drawings.

For reference, in FIGS. 1 and 2, the vertical position air inlet 31, the horizontal position air inlet 35 and the air outlet 33 are illustrated as being closed with caps.

Furthermore, a flexible air supply duct (not shown) is provided in the vehicle body and is removably coupled to the vertical position air inlet 31. The air outlet 33 is coupled to a flexible air discharge duct provided in the vehicle body, such that air is discharged outside the vehicle body.

Therefore, in case where the battery package 1 is vertically oriented, the air supply duct is coupled to the vertical position air inlet 31 for the supply of air into the battery package 1 through the vertical position air inlet 31. In case where the battery package 1 is horizontally oriented, the vertical position air inlet 31 is covered with the cap, and air is supplied into the battery package 1 by the horizontal position air supply means. In both cases, air supplied into the battery package 1 is discharged outside the vehicle through the air outlet 33 and the air discharge duct.

In a detailed description of the operation of the horizontal position air supply means, when the user rotates the drive cylinder 41, the rollers 45 of the flap valves 47, which are in rolling contact with the drive flanges 39 of the drive cylinder 41, are rotated, so that the flap valves 47 are rotated, thereby opening the inner barrel 43.

Therefore, air can pass through the inner barrel 43 from the lower end thereof. Here, air is filtered while passing through the inner barrel 43 and is then supplied into the battery package 1.

Furthermore, while the flap valves 47 are opened by rotation of the drive cylinder 41, the guide protrusion 51, which is rotated along with the drive cylinder 41, guides the spiral guide slot 53 of the connection cylinder 49, thus linearly moving the connection cylinder 49 upwards.

Hence, the connection cylinder 49 protrudes upwards from the rear floor. In this state, when the battery package 1 is placed in a horizontal position, the connection cylinder 49 is inserted into the horizontal position air inlet 35. Thus, air is supplied from the lower position of the vehicle body into the battery package 1 through the horizontal position air inlet 35 after passing through the inner barrel 43.

In the above state, the battery package 1 can reliably maintain the horizontally oriented state using the horizontal position locking bar 23, the catch 21, and the cylindrical shaft member 3.

When it is desired to stand the battery package 1 upright from the horizontally oriented state, the user rotates the cam knob 27, such that the locking bar 23 is removed from the catch 21 by the elasticity of the plate spring 25. Thereafter, the user places the battery package 1 upright and manipulates the handle 11 such that the battery package 1 is fastened to the vehicle body by the vertical position locking bars 19. Subsequently, the air supply duct is coupled to the vertical position air inlet 31, and the horizontal position air inlet 35 is covered with the cap.

When the drive cylinder 41 is rotated in a reverse direction, the connection cylinder 49 is moved downwards and, simultaneously, the flap valves 47 are returned to the closed state.

Figure 8:
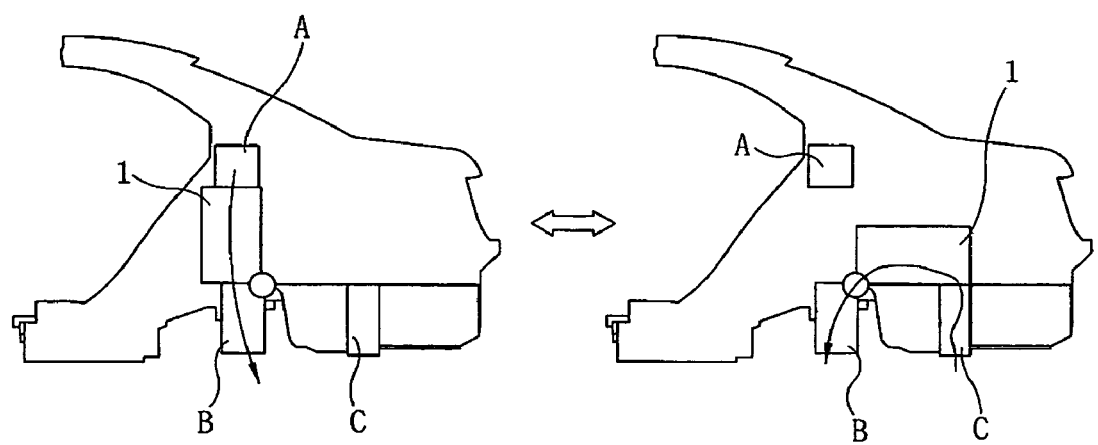
FIG. 8 is side views comparing a vertically oriented state and a horizontally oriented state of the battery package of FIG. 1 mounted in a vehicle body.

FIG. 8 compares a vertically oriented state (left view) with a horizontally oriented state (right view) of the battery package installed in the vehicle body. In the vertically oriented state, air is supplied from the air supply duct (A) into the battery package 1 through the vertical position air inlet 31 and is discharged outside the vehicle body through the air outlet 33 and the air discharge duct (B), as shown by the arrow. On the other hand, in the horizontally oriented state, air is supplied into the battery package 1 through the horizontal position air supply means (C), circulates in the battery package 1, and is discharged outside the vehicle body through the air discharge duct (B), as shown by the arrow.

The objectives of the present invention are achieved by the above-mentioned structures. In case where the battery package is vertically oriented, a relatively large space is defined behind the rear seat in the vehicle, the space can be used as a trunk space and the trunk space facilitates a process of placing or removing a spare tire into or from the trunk. Furthermore, because the amount of space that can be deformed to absorb impact in the event of a rear-end collision is increased, thereby enhancing the safety of vehicle users. In case where the battery package is horizontally placed, after the rear seat is folded, a relatively long article such as a pair of skis can be easily loaded into the vehicle. In addition, because it is not required to mount the battery package at an inclined angle of the rear seat of the vehicle, ease of assembly is improved.

As is apparent from the foregoing, battery mounting structures of the present invention can easily mount a battery package in a vehicle and easily change the position of the battery package between a vertical and a horizontal positions. The present structures ensure a large trunk space enough to absorb impact when a rear collision occurs and to store a spare tire. Also, the present structures make it possible to load relatively long articles such as skis into the vehicle simply by folding down a rear seat.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A battery mounting structure for a hybrid vehicle, comprising:
   a cylindrical shaft member provided in a rear edge of a lower end of a battery package to serve as a rotating shaft so that the battery package can rotatably move with respect to the cylindrical shaft member between a vertical position and a horizontal position;
   vertical position maintaining means to maintain the battery package in a vertically oriented state behind a rear seat of the vehicle;
   horizontal position maintaining means to maintain the battery package in a horizontally oriented state on an upper surface of a rear floor of the vehicle;
   a horizontal position air supply means to supply air from a rear floor side into the battery package through a rear surface of the battery package which is adjacent to the rear end of the vehicle while the battery package is horizontally oriented on the upper surface of the rear floor;
   a vertical position air inlet formed at an upper position in a first end surface of the battery package so that air is supplied into the battery package through the horizontal position air supply means or the vertical position air inlet; and
   an air outlet formed at a lower position in a second end surface of the battery package to discharge air, which is drawn into the battery package through the horizontal position air supply means or the vertical position air inlet.

2. The battery mounting structure as defined in claim 1, wherein the cylinder shaft member has, on its circumferential outer surface, a stop bead to be able to prevent the cylindrical shaft member from being moved in a longitudinal direction by seating into a stop groove in a support member provided in a vehicle body.

3. The battery mounting structure as defined in claim 1, wherein the vertical position maintaining means comprises:
   a handle rotatably provided on an upper surface of the battery package;
   a drive drum to be rotated by rotation of the handle;
   a saw-toothed rotator coupled to the drive drum through a belt; and
   vertical position locking bars placed on opposite sides of the saw-toothed rotator, wherein each of the vertical position locking bars has a plurality of insert holes spaced apart from each other at regular intervals, the insert holes are configured to engage with the saw-toothed rotator, and the vertical position locking bars can be advanced from or retracted into opposite end surfaces of the battery package by rotation of the saw-toothed rotator.

4. The battery mounting structure as defined in claim 1, wherein the horizontal position maintaining means comprises:
   a catch provided on a rear surface of the battery package, which is adjacent to the rear end of the vehicle;
   a horizontal position locking bar configured to linearly move in a direction parallel with the rear floor of the vehicle so that the horizontal position locking bar is removably locked to the catch while the battery package is horizontally oriented on the upper surface of the rear floor;
   a plate spring coupled to the horizontal position locking bar so that the horizontal position locking bar is biased by the plate spring in a direction in which the horizontal position locking bar is removed from the associated catch; and
   a cam knob having a vertical rotating shaft and provided on the rear floor so as to be rotatable around the vertical rotating shaft, so that when the cam knob is rotated in one direction, the locking bar is moved in a direction in which the locking bar is locked to the catch while overcoming the elasticity of the plate spring.

5. The battery mounting structure as defined in claim 4, wherein the horizontal position maintaining means further comprises:
   a support body mounted to the rear floor to cover the locking bar, the plate spring and the cam knob in a single body.

6. The battery mounting structure as defined in claim 1, wherein the horizontal position air supply means comprises:
   a horizontal position air inlet formed in the rear surface of the battery package;
   an outer barrel provided through the rear floor at a position corresponding to the horizontal position air inlet when the battery package is horizontally oriented on the upper surface of the rear floor;
   a drive cylinder rotatably provided in the outer barrel, with drive flanges respectively provided on upper and lower ends of the drive cylinder;
   an inner barrel provided in the drive cylinder and coupled at a portion thereof to the outer barrel; and
   a flap valve having a rotating shaft supported by the inner barrel, with a roller that is provided on the rotating shaft and is in rolling contact with one drive flange of the drive cylinder, so that when the drive flange is rotated, the flap valve is rotated around the rotating shaft perpendicular to a rotating axis of the drive flange to open or close the inner barrel.

7. The battery mounting structure as defined in claim 6, wherein the horizontal position air supply means further comprises:
   a connection cylinder provided between the drive cylinder and the inner barrel so as to be movable in a direction perpendicular to the rear floor, wherein a guide protrusion is provided on a circumferential inner surface of the drive cylinder, a spiral guide slot is formed in a circumferential outer surface of the connection cylinder, and a linear guide slot is longitudinally formed in the connection cylinder such that the rotating shaft of the flap valve is placed in the linear guide slot, so that when the drive cylinder is rotated, the connection cylinder can be moved in a vertical direction by rotation of the guide protrusion of the drive cylinder.

8. The battery mounting structure as defined in claim 6, wherein the horizontal position air supply means further comprises:

a filter provided in the inner barrel to filter air passing through the inner barrel.

9. A motor vehicle comprising the battery mounting structure as defined in claim 1.

10. A battery mounting structure for a hybrid vehicle, comprising:
- a cylindrical shaft member provided in a rear edge of a lower end of a battery package to serve as a rotating shaft so that the battery package can rotatably move with respect to the cylindrical shaft member between a vertical position and a horizontal position;
- vertical position maintaining means to maintain the battery package in a vertically oriented state behind a rear seat of the vehicle;
- horizontal position maintaining means to maintain the battery package in a horizontally oriented state on an upper surface of a rear floor of the vehicle;
- wherein the vertical position maintaining means comprises:
  - a handle rotatably provided on an upper surface of the battery package;
  - a drive drum to be rotated by rotation of the handle;
  - a saw-toothed rotator coupled to the drive drum through a belt; and
  - vertical position locking bars placed on opposite sides of the saw-toothed rotator, wherein each of the vertical position locking bars has a plurality of insert holes spaced apart from each other at regular intervals, the insert holes are configured to engage with the saw-toothed rotator, and the vertical position locking bars can be advanced from or retracted into opposite end surfaces of the battery package by rotation of the saw-toothed rotator.

11. A battery mounting structure for a hybrid vehicle, comprising:
- a cylindrical shaft member provided in a rear edge of a lower end of a battery package to serve as a rotating shaft so that the battery package can rotatably move with respect to the cylindrical shaft member between a vertical position and a horizontal position;
- vertical position maintaining means to maintain the battery package in a vertically oriented state behind a rear seat of the vehicle;
- horizontal position maintaining means to maintain the battery package in a horizontally oriented state on an upper surface of a rear floor of the vehicle;
- wherein the horizontal position maintaining means comprises:
  - a catch provided on a rear surface of the battery package, which is adjacent to the rear end of the vehicle;
  - a horizontal position locking bar configured to linearly move in a direction parallel with the rear floor of the vehicle so that the horizontal position locking bar is removably locked to the catch while the battery package is horizontally oriented on the upper surface of the rear floor;
  - a plate spring coupled to the horizontal position locking bar so that the horizontal position locking bar is biased by the plate spring in a direction in which the horizontal position locking bar is removed from the associated catch; and
  - a cam knob having a vertical rotating shaft and provided on the rear floor so as to be rotatable around the vertical rotating shaft, so that when the cam knob is rotated in one direction, the locking bar is moved in a direction in which the locking bar is locked to the catch while overcoming the elasticity of the plate spring.

12. The battery mounting structure as defined in claim 11 wherein the horizontal position maintaining means further comprises:
- a support body mounted to the rear floor to cover the locking bar, the plate spring and the cam knob in a single body.

\* \* \* \* \*